United States Patent
Ellec et al.

(10) Patent No.: US 9,760,096 B2
(45) Date of Patent: Sep. 12, 2017

(54) SYSTEM AND METHOD FOR USING A MODEL FOR IMPROVING CONTROL OF A MASS FLOW CONTROLLER

(71) Applicant: Illinois Tool Works Inc., Glenview, CA (US)

(72) Inventors: Chris Ellec, Glenview, IL (US); John Lull, Glenview, IL (US); Reza Jamasebi, Glenview, IL (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 425 days.

(21) Appl. No.: 14/378,527

(22) PCT Filed: Mar. 4, 2013

(86) PCT No.: PCT/US2013/028902
§ 371 (c)(1),
(2) Date: Aug. 13, 2014

(87) PCT Pub. No.: WO2013/134141
PCT Pub. Date: Sep. 12, 2013

(65) Prior Publication Data
US 2015/0039140 A1    Feb. 5, 2015

Related U.S. Application Data

(60) Provisional application No. 61/607,944, filed on Mar. 7, 2012.

(51) Int. Cl.
*G05D 7/00* (2006.01)
*G05D 7/06* (2006.01)

(52) U.S. Cl.
CPC .................... *G05D 7/0635* (2013.01)

(58) Field of Classification Search
None
See application file for complete search history.

(56) References Cited

U.S. PATENT DOCUMENTS 5,780,777 A * 7/1998 Selig ............... G01G 23/3707
177/211
5,911,238 A    6/1999 Bump et al.
(Continued)

FOREIGN PATENT DOCUMENTS

JP      2001147723 A    5/2001
JP      2005534110 A    11/2005
WO    WO 2011/033281 A1    3/2011

OTHER PUBLICATIONS

Bilgen et al. "Theoretical and Experimental Analysis of Hysteresis in Piezocomposite Airfoils Using Preisach Model". Journal of Aircraft. vol. 48, No. 6. Nov.-Dec. 2011.*

(Continued)

*Primary Examiner* — Adam Lee
(74) *Attorney, Agent, or Firm* — McGuireWoods LLP

(57) ABSTRACT

The disclosed embodiments include a method, apparatus, and computer program product for controlling the mass flow rate of a fluid. For example, the disclosed embodiments include a method and a mass flow controller configured to determine, using on valve hysteresis model, a valve drive necessary to generate a force to achieve a valve lift for moving an adjustable valve to a desired valve position based on a given flow setpoint for controlling the flow of a fluid.

14 Claims, 7 Drawing Sheets

(56) References Cited

U.S. PATENT DOCUMENTS

| | | | |
|---|---|---|---|
| 6,574,570 B1* | 6/2003 | Sato | G01M 7/00 |
| | | | 702/41 |
| 7,250,738 B1* | 7/2007 | Ting | H02N 2/062 |
| | | | 318/701 |
| 2002/0114732 A1 | 8/2002 | Vyers | |
| 2002/0198668 A1* | 12/2002 | Lull | G01F 25/0007 |
| | | | 702/45 |
| 2003/0120418 A1* | 6/2003 | Treichel | F02D 41/20 |
| | | | 701/105 |
| 2003/0214179 A1* | 11/2003 | Kusano | B60T 7/042 |
| | | | 303/115.1 |
| 2004/0243330 A1* | 12/2004 | Gray | H03H 11/1291 |
| | | | 702/76 |
| 2007/0215206 A1 | 9/2007 | Lull et al. | |
| 2009/0078055 A1 | 3/2009 | Lull et al. | |
| 2009/0093913 A1* | 4/2009 | Copeland, II | E05F 3/12 |
| | | | 700/282 |
| 2009/0210179 A1* | 8/2009 | Tang | H01M 10/48 |
| | | | 702/63 |
| 2010/0180951 A1 | 7/2010 | Smirnov | |
| 2010/0211229 A1* | 8/2010 | Hinami | F15B 21/087 |
| | | | 700/282 |
| 2011/0265578 A1 | 11/2011 | Johnson | |
| 2012/0179403 A1* | 7/2012 | Griffith | G05B 17/02 |
| | | | 702/65 |
| 2012/0197446 A1* | 8/2012 | Glaudel | G05D 7/0635 |
| | | | 700/282 |
| 2014/0195136 A1* | 7/2014 | Nakamura | F02D 23/00 |
| | | | 701/102 |

OTHER PUBLICATIONS

International Search Report and Written Opinion date mailed May 10, 2013 for International PCT Application PCT/US2013/028902.
Japanese Notice of Reasons for Rejection dated Apr. 25, 2017; Japanese Patent Application No. 2014-560998.

\* cited by examiner

SYSTEM AND METHOD FOR USING A MODEL FOR IMPROVING CONTROL OF A MASS FLOW CONTROLLER

BACKGROUND OF THE INVENTION

1. Field of the Invention

The present invention relates generally to methods and systems for controlling the mass flow rate of a fluid, and more particularly to the operation of mass flow controllers.

2. Discussion of the Related Art

Many industrial processes require precise control of various process fluids. For example, in the semiconductor industries, mass flow controllers are used to precisely measure and control the amount of a process fluid that is introduced to a process chamber. The term fluid is used herein to describe any type of matter in any state that is capable of flow. It is to be understood that the term fluid applies to liquids, gases, and slurries comprising any combination of matter or substance to which controlled flow may be of interest.

However, as technology progresses, the semiconductor processes continue to get tighter and tighter as the design geometry continues to shrink. Processes now require very fast response time (¼ second or even faster), strong immunity to perturbation (e.g. inlet pressure fluctuation) and large turn down (i.e. smaller minimum controllable setpoint).

Current mass flow controllers utilizing proportional, integral, and derivative (PID) based control are reaching the limit of their capability. They also require extensive tuning to be able to perform in a wide range of conditions and reject a large range of perturbation. For instance, tuning needs to be done for each specific application (i.e., type of fluid and operating conditions). Moreover, complex algorithms are required to be able to adjust the P, I and D when conditions change.

To combat some of these problems, the disclosed embodiments include a system and method for using a model for improving control of a mass flow controller.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments include a system and method for controlling a mass flow controller by utilizing a mathematical model of the various components of a mass flow controller for enabling a control scheme to be tailored to the customer application in ways that are not possible with a simple PID based control system. In addition, having a model based controller in the mass flow controller will enable automatic optimal response to the device under various conditions without requiring tuning for each specific application/condition.

The disclosed embodiments and advantages thereof are best understood by referring to FIGS. 1-13 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

Figure 1:
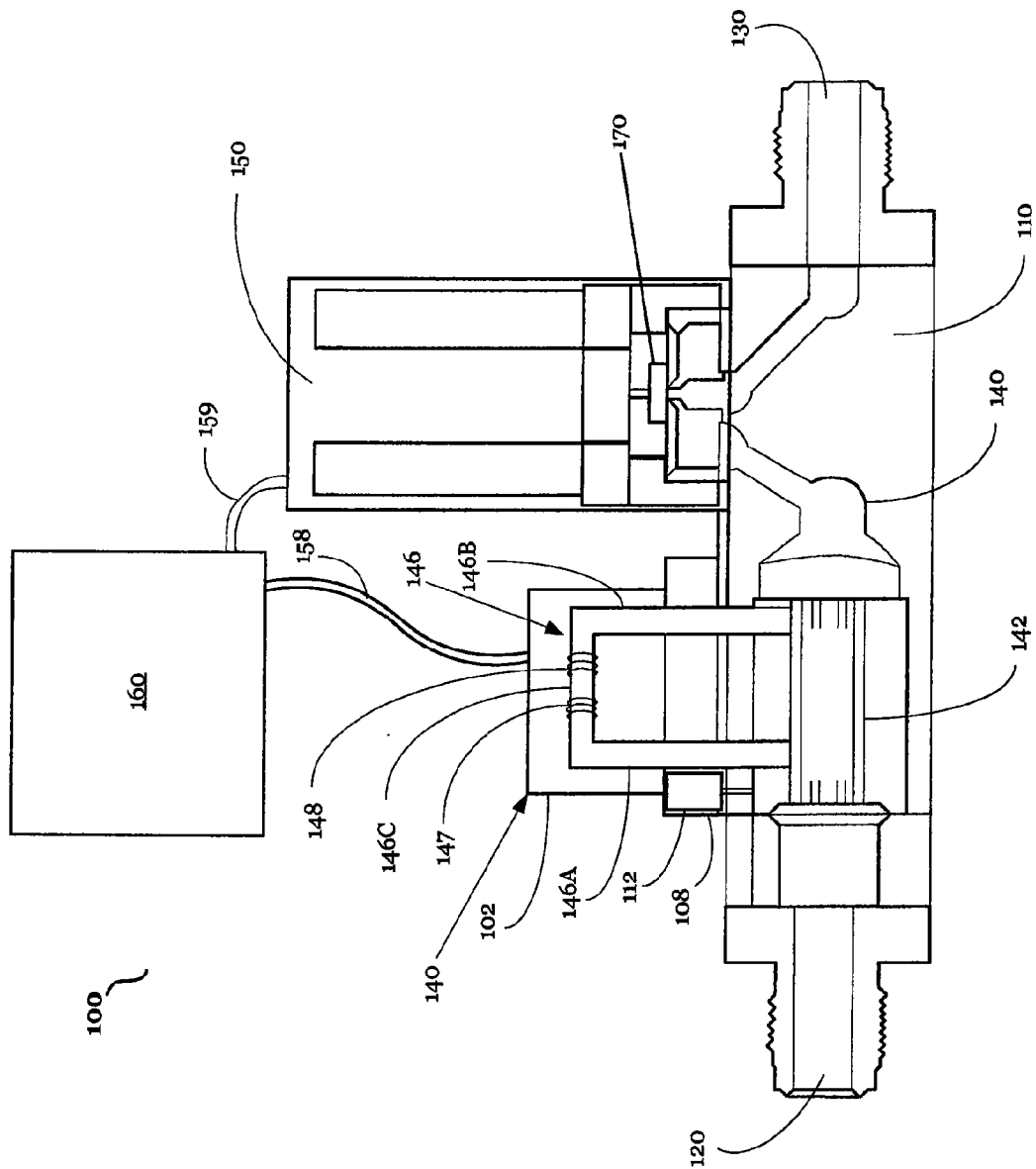
FIG. 1 illustrates components of a mass flow controller in accordance with the disclosed embodiments.

FIG. 1 shows schematically a typical mass flow controller 100 that includes a step 110, which is the platform on which the components of the MFC are mounted. A thermal mass flow meter 140 and a valve assembly 150 containing a valve 170 are mounted on the step 110 between a fluid inlet 120 and a fluid outlet 130. The thermal mass flow meter 140 includes a bypass 142 through which typically a majority of fluid flows and a thermal flow sensor 146 through which a smaller portion of the fluid flows.

Thermal flow sensor 146 is contained within a sensor housing 102 (portion shown removed to show sensor 146) mounted on a mounting plate or base 108. Sensor 146 is a small diameter tube, typically referred to as a capillary tube, with a sensor inlet portion 146A, a sensor outlet portion 146B, and a sensor measuring portion 146C about which two resistive coils or windings 147, 148 are disposed. In operation, electrical current is provided to the two resistive windings 147, 148, which are in thermal contact with the sensor measuring portion 146C. The current in the resistive windings 147, 148 heats the fluid flowing in measuring portion 146 to a temperature above that of the fluid flowing through the bypass 142. The resistance of windings 147, 148 varies with temperature. As fluid flows through the sensor conduit, heat is carried from the upstream resistor 147 toward the downstream resistor 148, with the temperature difference being proportional to the mass flow rate through the sensor.

An electrical signal related to the fluid flow through the sensor is derived from the two resistive windings 147,148. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 147,148 after signal processing comprise a sensor output signal.

The sensor output signal is correlated to mass flow in the mass flow meter so that the fluid flow can be determined when the electrical signal is measured. The sensor output signal is typically first correlated to the flow in sensor 146, which is then correlated to the mass flow in the bypass 142, so that the total flow through the flow meter can be determined and the control valve 170 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller and is an expensive, labor intensive procedure, often requiring one or more skilled operators and specialized equipment. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized. The dynamic response of the sensor is determined, that is, inaccurate effects of change in pressure or flow rate that occur when the flow or pressure changes are determined so that such effects can be compensated.

A bypass may then be mounted to the sensor, and the bypass is tuned with the known fluid to determine an appropriate relationship between fluid flowing in the mass flow sensor and the fluid flowing in the bypass at various known flow rates, so that the total flow through the flow meter can be determined from the sensor output signal. In some mass flow controllers, no bypass is used, and the entire flow passes through the sensor. The mass flow sensor portion and bypass may then be mated to the control valve and control electronics portions and then tuned again, under known conditions. The responses of the control electronics and the control valve are then characterized so that the overall response of the system to a change in set point or input pressure is known, and the response can be used to control the system to provide the desired response.

When the type of fluid used by an end-user differs from that used in tuning and/or calibration, or when the operating conditions, such as inlet and outlet pressure, temperature, range of flow rates, etc., used by the end-user differ from that used in tuning and/or calibration, the operation of the mass flow controller is generally degraded. For this reason, the flow meter can be tuned or calibrated using additional fluids (termed "surrogate fluids") and or operating conditions, with any changes necessary to provide a satisfactory response being stored in a lookup table. U.S. Pat. No. 7,272,512 to Wang et al., for "Flow Sensor Signal Conversion," which is owned by the assignee of the present invention and which is hereby incorporated by reference, describes a system in which the characteristics of different gases are used to adjust the response, rather than requiring a surrogate fluid to calibrate the device for each different process fluid used.

In addition, the mass flow controller 100 may include a pressure transducer 112 coupled to flow path at some point, typically, but not limited to, upstream of the bypass 142 to measure pressure in the flow path. Pressure transducer 112 provides a pressure signal indicative of the pressure. In accordance with the disclosed embodiments, the pressure transducer 112 is used to measure pressure during a rate of decay measurement.

Control electronics 160 control the position of the control valve 170 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a control valve drive signal) is generated based upon an error signal that is the difference between a set point signal indicative of the desired mass flow rate of the fluid and a feedback signal that is related to the actual mass flow rate sensed by the mass flow sensor. The control valve is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

In the illustrated example, the flow rate is supplied by electrical conductors 158 to a closed loop system controller 160 as a voltage signal. The signal is amplified, processed and supplied to the control valve assembly 150 to modify the flow. To this end, the controller 160 compares the signal from the mass flow sensor 140 to predetermined values and adjusts the proportional valve 170 accordingly to achieve the desired flow.

Figure 2:
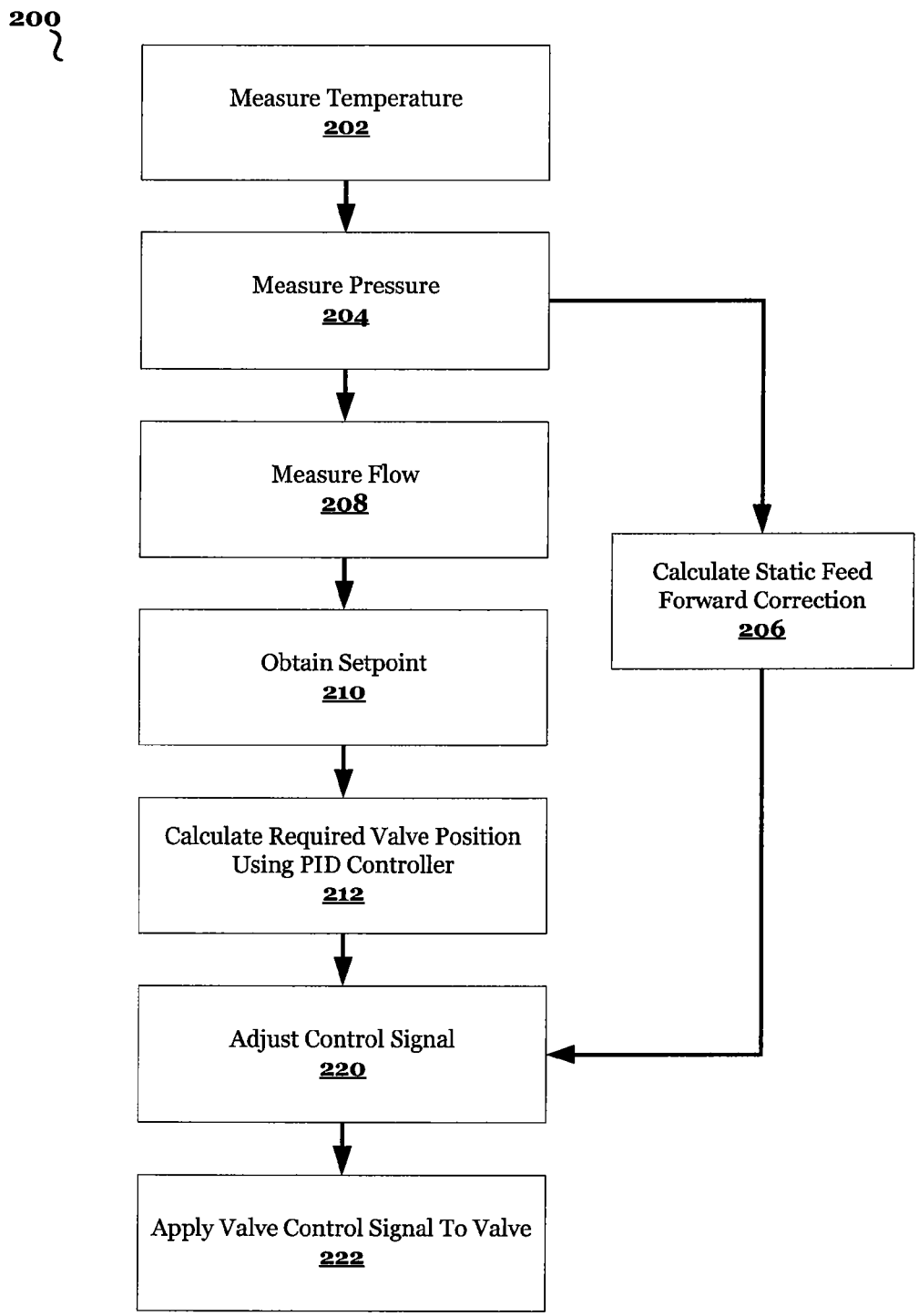
FIG. 2 illustrates a flow diagram illustrating an example of a PID control loop.

FIG. 2 is a flow diagram illustrating a typical PID control loop with feed-forward correction in accordance with the disclosed embodiments. The PID control loop 200 begins at step 202 by measuring temperature to determine a temperature along the fluid path. At step 204, the PID control loop 200 measures pressure using a pressure transducer. The PID control loop 200 at step 206 calculates a static feed-forward correction value(s) using the measured pressure. The PID control loop 200 uses the static feed-forward correction value(s) to adjust the control signal at step 220 to counter the pressure disturbance. The PID control loop 200 measures the flow using the flow meter at step 208. At step 210, the PID control loop 200 obtains the setpoint. The PID control loop 200 calculates the required valve position using the PID controller at step 212. The PID control loop 200 adjusts the control signal at step 220 to be able to obtain the calculated required valve position. The PID control loop 200 applies the valve control signal to the valve, at step 222, in order to move the valve to the calculated required valve position, with the PID control loop 200 repeating thereafter.

In contrast to the PID control loop 200, the disclosed embodiments herein describes a control loop that utilizes a mathematical model of the various component of a mass flow controller to enable the control scheme to be tailored to the customer application in ways that are not possible with simple PID based control system. For instance, the disclosed embodiments may utilize models of, but not limited to, the following mass flow controller components: a sensor model to model the characteristics of the sensor under different flow conditions and gases; a valve model to model the characteristics of the valve under different flow condition (e.g. actual flow, temperature, gas characteristics, inlet and outlet pressure, etc), including magnetic hysteresis, and lift vs. force; a bypass model to model the characteristics of the bypass as a function of gas, flow, inlet pressure, etc.; and a controller model to model the characteristics on the controller as it applies to the complete MFC.

Figure 3:
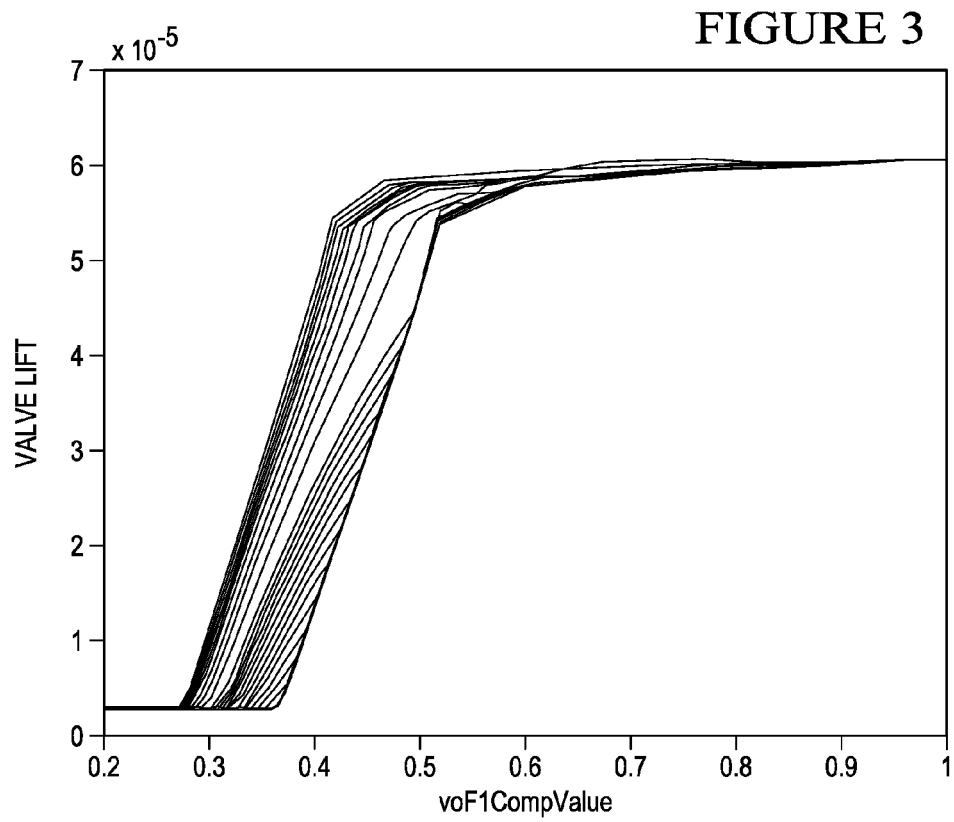
FIG. 3 illustrates an example of a valve flow model in accordance with the disclosed embodiments.
Figure 4:
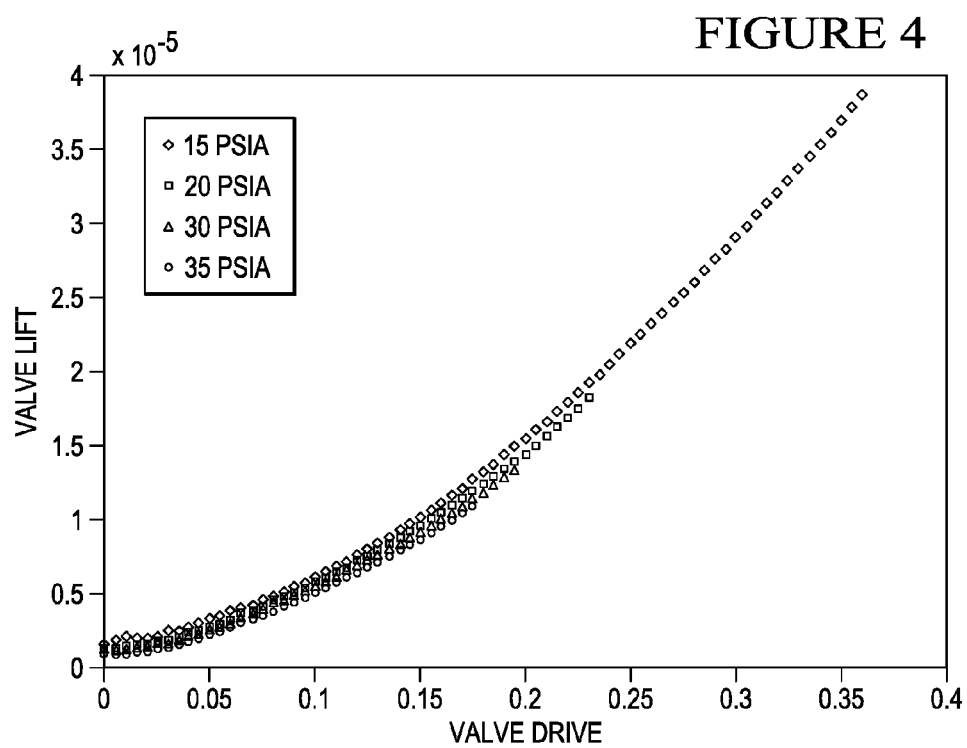
FIG. 4 illustrates an example of a valve force versus lift model in accordance with the disclosed embodiments.
Figure 5:
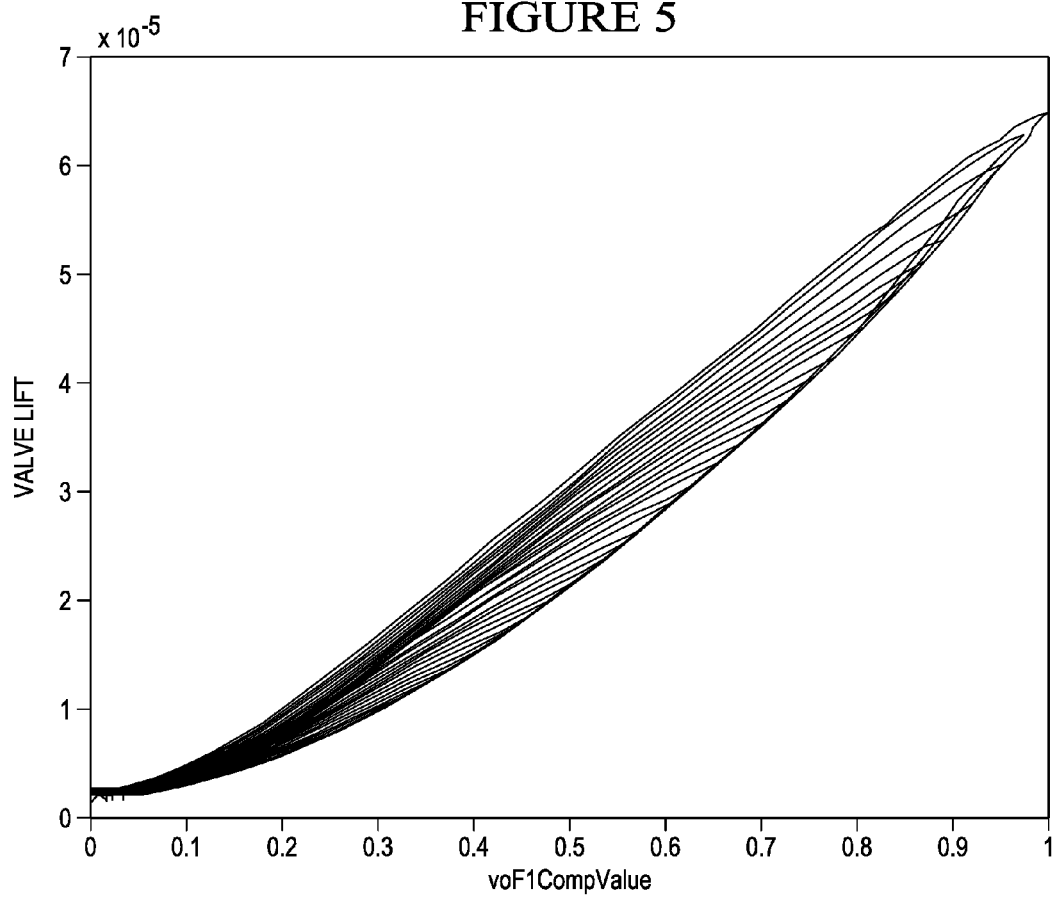
FIG. 5 illustrates an example of a valve hysteresis model in accordance with the disclosed embodiments.

As non-limiting examples, FIG. 3 illustrates an example of a valve flow model 300, FIG. 4 illustrates a valve force versus lift model 400, and FIG. 5 illustrates an example of a valve hysteresis model 500 (with no preload).

Figure 6:
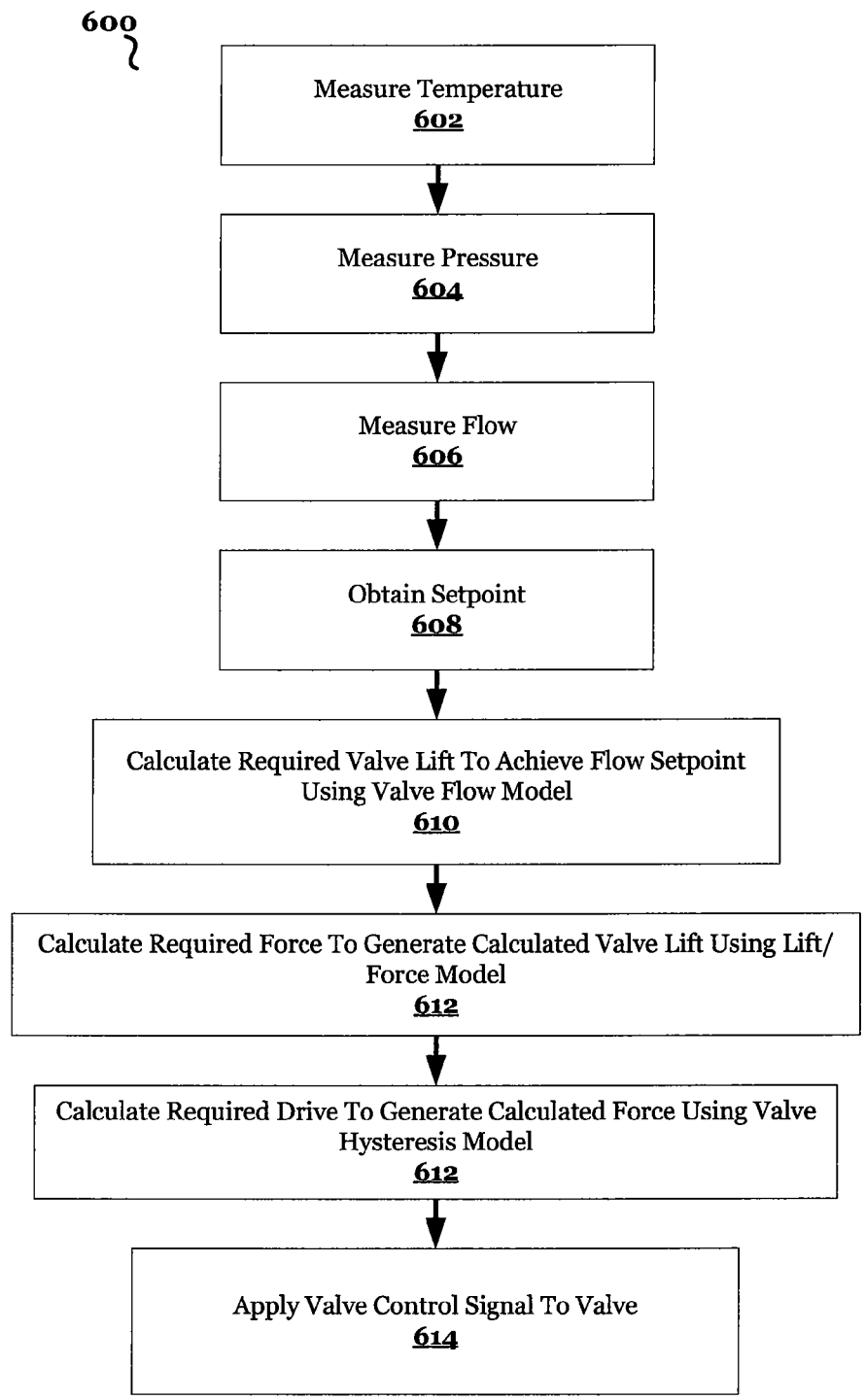
FIG. 6 is a flow diagram illustrating an example of a model based control loop in accordance with the disclosed embodiments.

FIG. 6 is a flow diagram illustrating an example of a model based control loop 600 that utilizes the models of the various component of a mass flow controller in accordance with the disclosed embodiments. The model based control loop 600 may be implemented in a controller of a mass flow controller to provide automatic optimal response to the device under various conditions without requiring tuning for each specific application/condition.

Similar to the PID control loop 200, the model based control loop 600 begins by measuring temperature to determine a temperature along the fluid path at step 602. At step 604, the model based control loop 600 measures pressure using a pressure transducer. The model based control loop 600 measures the flow using the flow meter at step 606. At step 608, the model based control loop 600 obtains the setpoint.

At step 610, the model based control loop 600 performs a calculation to determine the required valve lift to achieve flow setpoint using a valve flow model as illustrated in FIG. 3. The valve flow model is implemented in manufacturing software to calculate fixed coefficients that are written into the mass flow controller. In one embodiment, the algorithm is implemented inside the mass flow controller itself and runs in real time.

In one implementation, in generating the valve flow model 300, the flow of fluid at different inlet and outlet pressures are physically modeled as predominately consisting of two components: the viscous pressure drop and the inviscid (dynamic) pressure drop. By summing the contributions of each of these components where the effective displacement of the valve for each component is equal, the effective displacement of the valve may be empirically determined using the following methodology. The determination of the effective displacement of the valve at a particular fluid flow rate on a particular fluid enables a gain term associated with the valve to be determined, and thus the determination of a gain term associated with the valve actuator.

In general, each component that is part of the model based control loop 600 may have an associated gain. The term gain refers to the relationship between an input and an output of a particular component or group of components. For instance, a gain may represent a ratio of a change in output to a change in input. A gain may be a function of one or more variables, for example, one or more operating conditions and/or characteristics of a mass flow controller (e.g., flow rate, inlet and/or outlet pressure, temperature, valve displacement, etc.) In general, such a gain function will be referred to as a gain term. A gain term and more particularly, the representation of a gain term may be a curve, a sample of a function, discrete data points, point pairs, a constant, etc.

In one embodiment, allowing the upstream or inlet pressure to be represented by $P_1$ and the downstream or outlet pressure to be represented by $P_2$, then at a mass flow rate represented by Q, the valve-lift is represented by H, and the viscous effect alone reduces the pressure from $P_1$ to some intermediate pressure $P_x$. The inviscid compressible flow further reduces the pressure from an intermediate pressure $P_x$ to $P_2$. Modeling the viscous pressure drop across the valve 170 based upon a physical model of viscous flow of fluid between two parallel plates (e.g., between a valve seat and a jet surface), the distance H between the two parallel plates (e.g., the displacement of the valve 170) is provided by the following equation:

$$H^3 = \frac{24 \cdot \mu Q L R T}{w(P_1^2 - P_x^2)} \cdot 1.654 \times 10^{-18} (\text{ft}^3) \quad \text{(equation 1)}$$

where:
$P_1$, $P_x$: Pressure upstream and downstream of the viscous surface (psi);
Q: Mass flow rate (sccm);
L: length of the flow path (ft);
H: distance between the two parallel surfaces (ft);
w: the breadth of the flow path, w equals π·Ø and Ø is the mean diameter of plateau, Ø is equal to 0.040" based upon the tested valve;
μ: dynamic viscosity of the gas (centi-Poise);
T: Absolute temperature (deg. Rankine); and
R: gas constant (ft-lbf/lbm-deg. R).

Modeling the inviscid pressure drop across the valve 170 based upon a physical model of inviscid flow of fluid through an orifice or jet provides $$\frac{Q}{A} = 1.2686 \times 10^6 P_{x,0} \left(\frac{2}{\gamma+1}\right)^{\left(\frac{\gamma+1}{2(\gamma-1)}\right)} \sqrt{\frac{\gamma}{M_w T_{1,0}}} \quad \text{(equation 2)}$$

for choked flow; and:

$$\frac{Q}{A} = 1.2686 \times 10^6 P_{x,0} \left(\frac{P_2}{P_{x,0}}\right)^{\left(\frac{\gamma+1}{2\gamma}\right)} \quad \text{(equation 3)}$$

$$\sqrt{\frac{2\gamma}{(\gamma-1)M_w T_{1,0}} \left\{\left(\frac{P_{x,0}}{P_2}\right)^{\left(\frac{\gamma-1}{\gamma}\right)} - 1\right\}}$$

for unchoked flow; where the flow is choked if $$\frac{P_2}{P_{x,0}} \leq \left(\frac{2}{\gamma+1}\right)^{\left(\frac{\gamma}{\gamma-1}\right)} \quad \text{(equation 4)}$$

and unchoked otherwise, and where:
Q=flow through the valve (sccm);
A=π·Ø·H=valve effective area (sq. in);
Ø=diameter of orifice;
$M_w$=gas molecular weight (gm/mol);
$P_x,0$,=upstream total pressure (torr);
$P_2$=downstream static pressure (torr);
$T_{1,0}$=gas temperature (K);
γ=ratio of specific heats.

From the above viscous and inviscid equations, the effective displacement (i.e., H) of the valve 170 may be readily determined One exemplary method of calculating the effective displacement is to estimate the intermediate pressure Px by trial-and-error, where one calculates the values of H from both the viscous flow theory (Hv, Eq. 1) and the inviscid theory (Hi, Eq. 2 or 3), depending on whether the flow is choked or not, (Eq. 4). Thus, if the intermediate pressure is approximately twice the outlet pressure, choked flow may be assumed, and equation 2 is used for the inviscid component of the calculation, whereas if the inlet pressure is less than approximately twice the outlet pressure, equation 3 is used for the inviscid component of the calculation. For a given Q, $P_1$, and $P_2$, the correct Px is obtained when the viscous valve-lift (Hv) and the inviscid valve-lift (Hi) become equal to each other. Thus, the computational scheme involves successive iteration to obtain $P_x$. The calculation begins by choosing $P_x$ to be mid-way between $P_1$ and $P_2$. Then, Hv and Hi are calculated. If it is determined that Hv is greater than Hi, meaning that there is not enough differential pressure for the viscous flow to deliver the required flow than for the inviscid flow, then during the next iteration, a lower pressure $P_x'$ will be chosen, i.e., between the downstream pressure $P_2$ and the previous pressure $P_x$. The iteration continues until the two calculated valve-lift Hv and Hi come within some threshold of each other. As stated above, this iterative process may be performed in software implemented inside the mass flow controller itself and may be executed in real time. Accordingly, based upon the above method, the effective displacement of the valve 170 may be determined for each of a number of different flow rates.

It should be appreciated that different valves and valve types may have different physical models. Furthermore, there may be more than one physical model that may be used to model the characteristics of any particular valve. Accordingly, the present invention is not limited to any particular valve model.

Referencing back to FIG. 6, the model based control loop 600 at step 612 calculates the required force to generate said lift using a lift versus force model, such as, but not limited to, the lift versus force model 400 illustrated in FIG. 4. In one embodiment, the lift versus force model is based on the force balance equation: F=kx+deltaP*A. With k the spring constant equivalent of the valve, x being the amount of displacement, deltaP being the pressure difference across the valve, and A equaling the surface area of the valve seat exposed to the pressure difference.

The model based control loop 600 then, at step 614, calculates the required drive to generate said force using a valve hysteresis model, such as, but not limited to, the valve hysteresis model 500. The model based control loop 600 applies the valve control signal to the valve, at step 616, using the calculated drive to move the valve to the required position, with the model based control loop 600 repeating thereafter.

In one embodiment, the valve hysteresis model in step 614 is implemented as software or firmware inside the mass flow controller utilizing the classical Preisach model. The Preisach model is used to capture the non linearity of the hysteresis characteristics of the electromagnetic or Piezo actuator by modeling the amount of force as a function of actuator drive. The main element of the Preisach model is a force vs. valve drive surface map, Ms, which accounts for changes in force as a function of the history of the valve drive over time. The Preisach function P(U,V) is the density function of all the hysterons in the magnetic material. The total magnetization is represented by the equation:

$$Ms = \iint_{U,V} P(U,V) \, dU \, dV \quad \text{(equation 5)}$$

Figure 8:
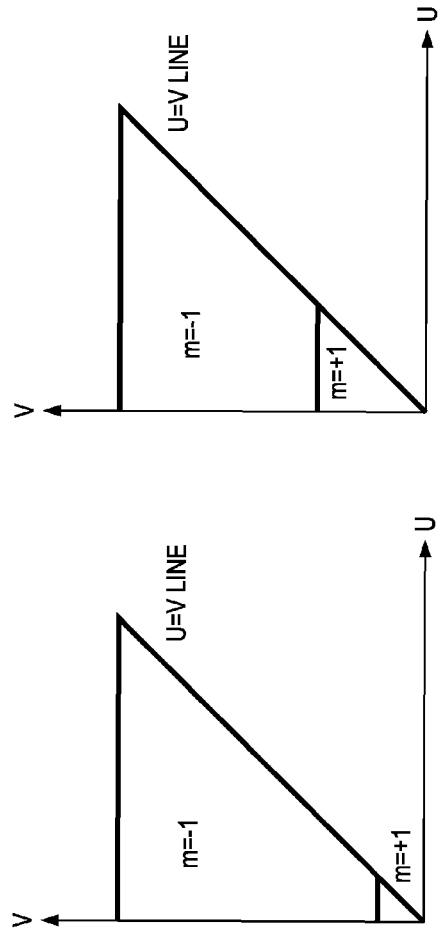
FIG. 8 illustrates an initial state of a surface map represented on a Preisach plane.
Figure 9:
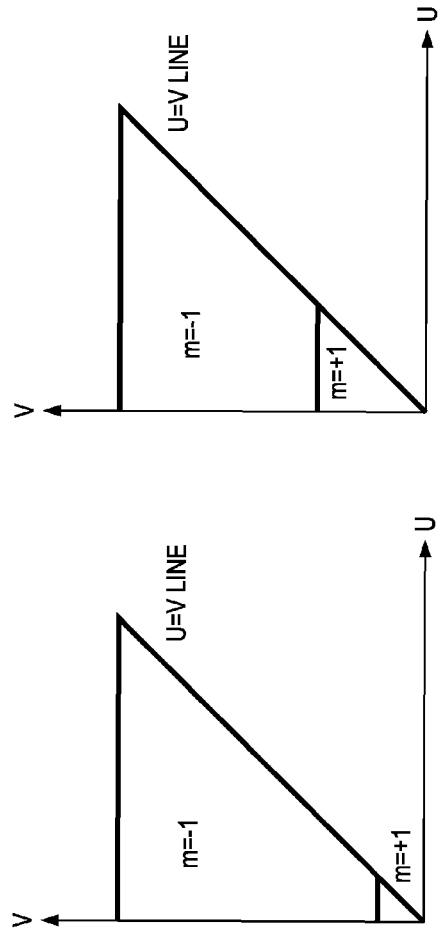
FIG. 9 illustrates the surface map of FIG. 8 after increasing the magnetic field in a monotonic fashion.
Figure 10:
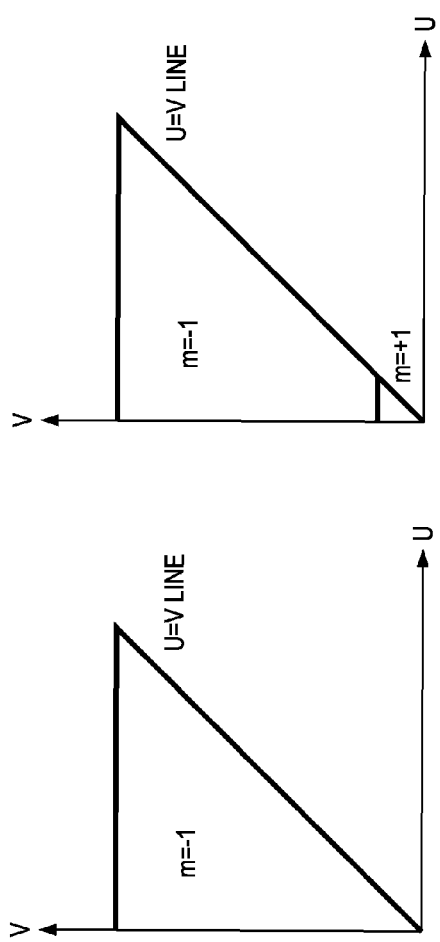
FIG. 10 illustrates the surface map of FIG. 9 when the magnetic field is increased.

The magnetization can be represented on a Preisach plane. For example, FIG. 8 illustrates an initial state of a surface map 800 represented on a Preisach plane. The initial state is assumed to be with all the hysterons in the −1 state (i.e., the surface map 800 is completely inactive). In FIG. 8, U represents the valve drive, V represents the force required for a given lift, and m=−1 is the inactive surface area. In one embodiment, U is assumed to greater than V, thus, only a triangle is needed to represent the whole system. After increasing the field in a monotonic fashion, a small number of hysterons (those with low sensitivity) switch their magnetization from −1 to +1 (m=+1 is the surface area that is active). This is represented by the small area at the bottom of the triangle in FIG. 9. As the field continues to increase, more hysterons switch to the +1 magnetization shown in FIG. 10.

Figure 7:
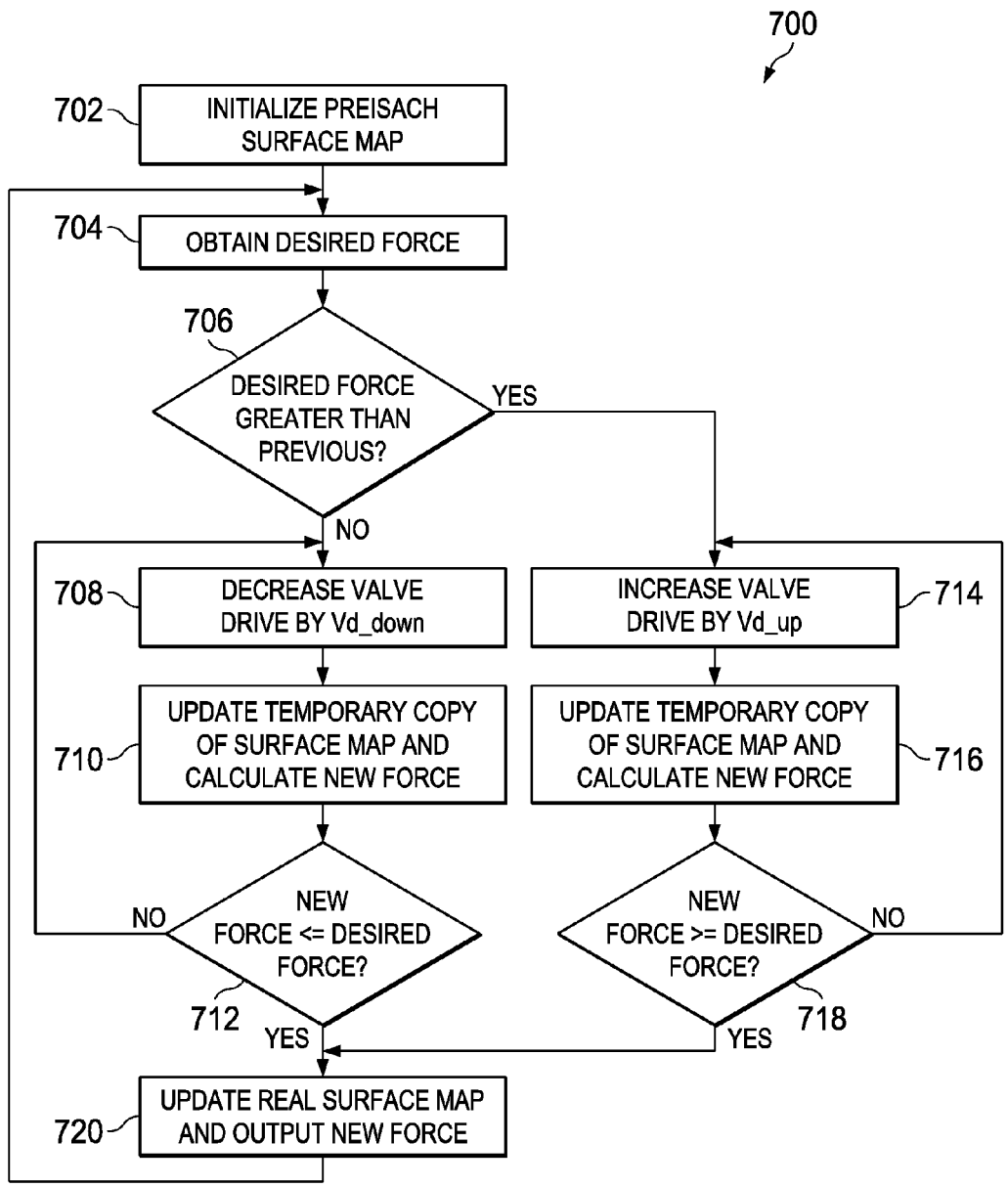
FIG. 7 illustrates a process for dynamically generating and updating a surface map that indicates the state of the hysteresis as a function of all the previous valve positions.

By integrating the active surface area, the disclosed embodiments are able to track the valve actuator force as function of valve drive over time. Otherwise stated, the dynamic surface map is a live table with the state of the hysteresis as a function of all the previous positions. For example, FIG. 7 depicts a process 700 for dynamically generating and updating a surface map that indicates the state of the hysteresis as a function of all the previous valve positions. In one embodiment, after a mass flow controller powers up, the process 700 is initiated at step 702. The process 700 may also be initiated each time the MFC control algorithm receives a zero setpoint and the valve is turned off.

Figure 11:
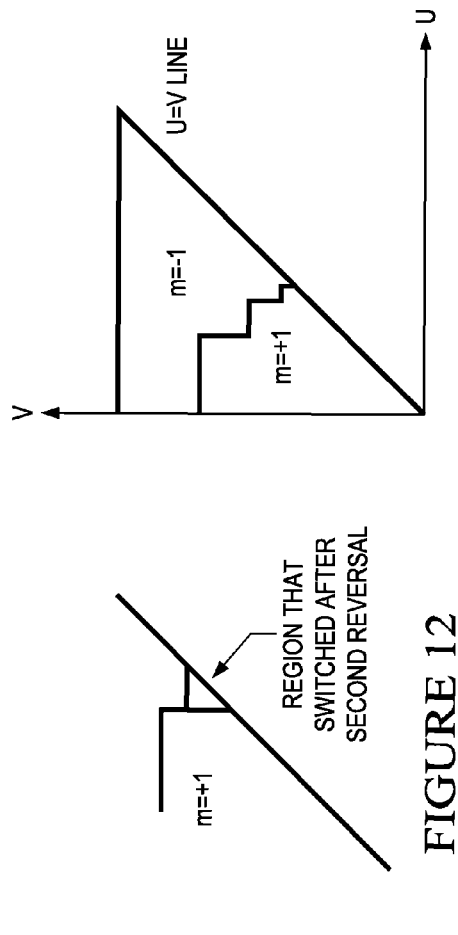
FIG. 11 illustrates the surface map of FIG. 10 after decreasing the valve drive.

The process 700 at step 704 calls an update function that receives a desired force as an input. At step 706, the process determines whether the desired force is greater than or less than a current force. If the process determines at step 706 that the desired force is less than the current force, the process at step 708 subtracts a value Vd_down from the current drive. At step 710, the process updates a temporary copy of the surface map as shown in FIG. 11 and calculates a new force. The process determines whether the new force is less than or equal to the desired force at step 712. If the process determines that the new force is not less than or equal to the desired force, the process repeats the process at step 708 by subtracting a value Vd_down from the current drive until the new force is not less than or equal to the desired force. Once this occurs, the process at step 720 updates the real surface map and outputs the required valve drive value.

Figure 12:
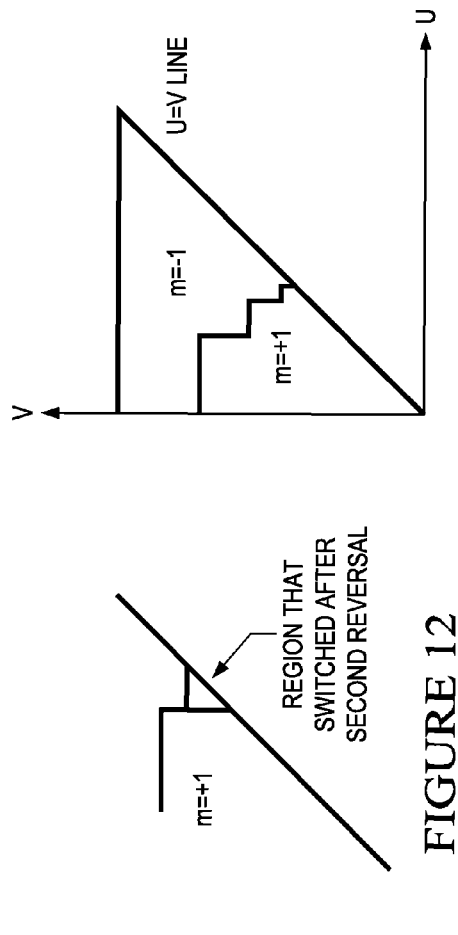
FIG. 12 illustrates the surface map of FIG. 11 after increasing the valve drive.
Figure 13:
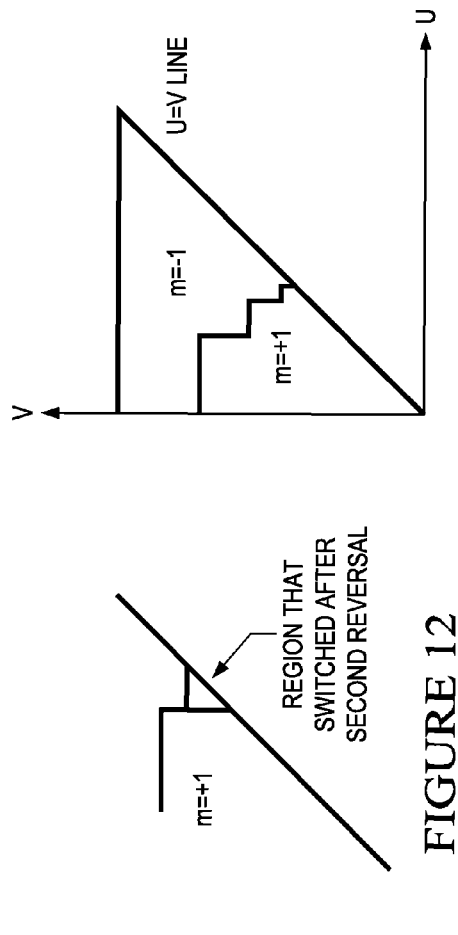
FIG. 13 illustrates an example of the surface map after a number of iterations of increasing and decreasing the valve drive.

However, if the process determines at step 706 that the desired force is greater than the current force, the process at step 714 adds a value Vd_up to the current drive. At step 716, the process updates a temporary copy of the surface map as shown in FIG. 12 and calculates a new force. The process determines whether the new force is greater than or equal to the desired force at step 718. If the process determines that the new force is not greater than or equal to the desired force, the process repeats the process at step 714 by adding a value Vd_down from the current drive until the new force is not greater than or equal to the desired force. Once this occurs, the process at step 720 updates the real surface map and outputs the required valve drive value. FIG. 13 illustrates an example of the surface map after a number of iterations using the above process. The process 700 is repeated every time a new desired force is obtained.

In one embodiment, the below discrete matrix is used to represent equation 5 shown above.

$$P = \begin{bmatrix} p(0,0) & \cdots & p(0,N) \\ \vdots & \ddots & \vdots \\ p(L,0) & \cdots & p(L,N) \end{bmatrix}$$

with p(i,j)=0 for j>=i.

Every column of the matrix represents a different valve drive. The resolution of the valve drive determines the size of the matrix. For example, a 1% resolution necessitates a 100×M matrix. The rows are the force resulting from the drive. Note that the matrix does not have to be square, so M could be lower or greater than 100. As the valve drives does up and down, cells of the matrix alternatively becomes 1 and 0 to create the active/inactive surface map as shown in FIG. 13.

In certain embodiments, the process 700 could implement a "dead band", as well as steps for adjusting the values for Vd_up and Vd_down based on for example inlet pressure, temperature or gas characteristics.

In an alternative embodiment, process 700 may be modified to only keep track of the maximum and minimum inflexion points in the Preisach map in order to reduce the computational and memory requirement of the algorithm. The Preisach map is then inverted to obtain the required drive needed to generate a given force. In addition, alternative embodiments may implement other mathematical models of the hysteresis effect, such as, but not limited to the Chua and Stromsmoe model, the files and Atherton model, or the Karnopp model.

Still, in another embodiment, a model-based mass flow controller may utilize the PID control as described previously in FIG. 2, and add the hysteresis model where the control variable out of the PID is the force that the hysteresis model converts into drive (as opposed to the control variable out of the PID being the drive, i.e., step 220). This provides the advantages of greatly reduced hysteresis in the control system, which in turn speeds up recovery from perturbation.

Accordingly, as described above, advantages of the disclosed embodiments include, but are not limited to, providing a model based controller in a mass flow controller that is configured to enable automatic optimal response to the device under various conditions without requiring tuning for each specific application/condition.

While specific details about the above embodiments have been described, the above hardware and software descriptions are intended merely as example embodiments and are not intended to limit the structure or implementation of the disclosed embodiments.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Those skilled in the art will recognize that the present teachings are amenable to a variety of modifications and/or enhancements. While the foregoing has described what is considered to be the best mode and/or other examples, it is understood that various modifications may be made therein and that the subject matter disclosed herein may be implemented in various forms and examples, and that the teachings may be applied in numerous applications, only some of which have been described herein. Such modifications are intended to be covered within the true scope of the present teachings.

In addition, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A mass flow controller for controlling a flow of a fluid, the mass flow controller comprising:
   an inlet for receiving the fluid;
   a flow path in which the fluid passes through the mass flow controller;
   a mass flow meter for providing a signal corresponding to mass flow of the fluid through the flow path;
   an adjustable valve for regulating the flow of the fluid out of an outlet of the mass flow controller;
   at least one processing component configured to execute instructions to:

initialize a Preisach model indicative of a state of hysteresis associated with the adjustable valve as a function of previous positions of the adjustable valve;

receive a desired force to achieve a valve lift for moving the adjustable valve to a desired valve position based on a given flow setpoint; and perform at least one iteration of updating the Preisach model by performing one of increasing or decreasing a valve drive until the desired force is obtained; and a controller configured to apply a valve control signal based on the valve drive to adjust the adjustable valve to the desired valve position to control the flow of the fluid out of the outlet of the mass flow controller.

2. The mass flow controller of claim 1, further comprising a temperature sensor for determining a temperature along the flow path.

3. The mass flow controller of claim 1, further comprising a pressure transducer for providing a signal corresponding to a fluid pressure of the fluid near the inlet of the flow path.

4. The mass flow controller of claim 1, wherein the mass flow meter is a thermal mass flow meter that includes a flow sensor.

5. The mass flow controller of claim 1, wherein the at least one processing component is configured to execute instructions to determine the valve lift using a valve flow model.

6. The mass flow controller of claim 1, wherein the at least one processing component is configured to execute instructions to determine the force to achieve the valve lift using a valve lift versus force model.

7. The mass flow controller of claim 1, wherein the at least one processing component is configured to execute instructions to obtain an end user-specified value that is used in increasing or decreasing the valve drive until the desired force is obtained.

8. The mass flow controller of claim 1, wherein the at least one processing component is configured to execute instructions to utilize a manufacturer-specified value in increasing or decreasing the valve drive until the desired force is obtained.

9. A method for controlling a flow of a fluid, the method comprising:

initializing a Preisach model indicative of a state of hysteresis associated with an adjustable valve as a function of previous positions of the adjustable valve;

receiving a desired force to achieve a valve lift for moving the adjustable valve to a desired valve position based on a given flow setpoint;

performing at least one iteration of updating the Preisach model by performing one of increasing or decreasing a valve drive until the desired force is obtained; and applying, using a processor, a valve control signal based on the valve drive to adjust the adjustable valve to the desired valve position to control the flow of the fluid.

10. The method of claim 9, further comprising determining, using the processor, a temperature and a fluid pressure along a flow path of the fluid.

11. The method of claim 9, further comprising determining, using the processor, the valve lift using a valve flow model.

12. The method of claim 9, further comprising determining, using the processor, the force to achieve the valve lift using a valve lift versus force model.

13. The method of claim 9, further comprising receiving an end user-specified value that is used in increasing or decreasing the valve drive until the desired force is obtained.

14. The method of claim 9, further comprising utilizing a manufacturer-specified value in increasing or decreasing the valve drive until the desired force is obtained.

* * * * *